United States Patent
Lowery (10) Patent No.: US 8,233,799 B2
(45) Date of Patent: Jul. 31, 2012

(54) METHOD AND APPARATUS FOR IMPROVING RECEPTION OF OPTICAL SIGNALS

(75) Inventor: Arthur James Lowery, Kew (AU)

(73) Assignee: Ofidium Pty, Ltd., Melbourne (AU)

( * ) Notice: Subject to any disclaimer, the term of this patent is extended or adjusted under 35 U.S.C. 154(b) by 239 days.

(21) Appl. No.: 12/682,147

(22) PCT Filed: Oct. 15, 2008

(86) PCT No.: PCT/AU2008/001526
§ 371 (c)(1),
(2), (4) Date: Jul. 6, 2010

(87) PCT Pub. No.: WO2009/049364
PCT Pub. Date: Apr. 23, 2009

(65) Prior Publication Data
US 2011/0013914 A1    Jan. 20, 2011

(30) Foreign Application Priority Data
Oct. 15, 2007    (AU) ................................ 2007905646

(51) Int. Cl.
*H04B 10/06* (2006.01)

(52) U.S. Cl. ............................ 398/76; 398/208; 398/212

(58) Field of Classification Search ................... 398/76, 398/202, 208, 212–213
See application file for complete search history.

(56) References Cited

U.S. PATENT DOCUMENTS

| 5,227,908 A | 7/1993 | Henmi |
| 5,373,383 A | 12/1994 | LaGasse |
| 6,959,154 B1 | 10/2005 | Gnauck |

FOREIGN PATENT DOCUMENTS

| JP | 2004-080350 | 3/2004 |
| WO | WO 02/061986 A2 | 8/2002 |

OTHER PUBLICATIONS

Mecozzi, "Noiseless amplification and signal-to-noise ratio in single-sideband transmission," Feb. 1, 2003, pp. 203-205, vol. 28, No. 3.

*Primary Examiner* — Leslie Pascal
(74) *Attorney, Agent, or Firm* — Woodcock Washburn LLP (57) ABSTRACT

A method and apparatus for receiving digital information transmitted via an optical signal over an optical channel wherein the optical signal includes an optical carrier (402) and at least one information-bearing optical sideband (404) in the optical frequency domain. The transmitted optical power is distributed between the optical carrier (402) and the optical side band (404). The received optical signal is processed in order to increase the received power in the optical carrier (402) relative to the power in the optical side-band (404). The processed optical signal is detected in order to produce a corresponding electrical signal. The electrical signal is then processed in order to recover the digital information. Advantageously, increasing the optical carrier power relative to the power in the information-bearing sideband results in improved quality of the detected electrical signal, enabling an improved power budget to be achieved, which in turn allows for longer transmission distances, increased transmitted information rates, and/or improved transmission error performance as compared with conventional direct detection optical transmission systems.

15 Claims, 5 Drawing Sheets

METHOD AND APPARATUS FOR IMPROVING RECEPTION OF OPTICAL SIGNALS

CROSS-REFERENCE TO RELATED APPLICATIONS

This application is the National Stage of International Application No. PCT/AU2008/001526 filed Oct. 15, 2008, which claims the benefit of Australian Application No. 2007905646, filed Oct. 15, 2007, the disclosures of which are incorporated herein by reference in their entireties.

FIELD OF THE INVENTION

The present invention relates generally to optical communications, and more particularly to a method and apparatus for improving the quality of reception of optical signals transmitted along with a corresponding optical carrier. The invention may have particular benefits when employed in conjunction with subcarrier multiplexed optical signals, including orthogonal frequency division multiplexed (OFDM) signals, and/or in combination with optical single sideband (OSSB) and related transmission and modulation techniques. However, the invention is not limited to systems employing such techniques.

BACKGROUND OF THE INVENTION

Optical transmission, in which an information signal is modulated onto an optical carrier, is widely employed in modern communications systems. In particular, wide area communications networks employ long-haul transmission links using single-mode optical fibres for the transmission of digital information at very high bit rates, using one or more optical carriers, or wavelengths, over each fibre. With the advent of practical optical amplifiers, the maximum distance over which data may be transmitted in single-mode optical fibres before some form of regeneration is required is substantially limited by dispersion and nonlinear processes. In particular, the impact of chromatic dispersion increases rapidly as the bit rate of optical data channels is increased. Methods and apparatus capable of compensating chromatic dispersion, as well as other processes such as polarisation mode dispersion (PMD) and optical nonlinearities, are thus of vital importance in the deployment of modern communications systems.

While various techniques for performing compensation within the optical domain have previously been developed, there has more recently been great interest in the use of electronic compensation techniques, in part due to the greater capability for electronic systems (including digital- and software-based systems) to be adapted and/or reconfigured automatically in accordance with varying requirements, eg within different systems, different parts of a single system, and/or over time. By contrast, many optical techniques, and corresponding devices and apparatus, are not readily reconfigurable in the field.

One approach which enables highly reconfigurable electronic compensation for chromatic dispersion, and other effects of optical transmission, is disclosed in international application publication no. WO 2007/041799. In particular, there is described therein methods and apparatus which employ optical single sideband (OSSB) transmission, in combination with conventional direct detection (DD) techniques, to enable the use of frequency domain equalisation at the receiver, most preferably via orthogonal frequency division multiplexing (OFDM), for electronic dispersion compensation. This approach enables numerous advantages to be realised, including the use of relatively low-cost direct detection optical receivers, a high degree of scalability, good spectral efficiency, improved tolerance to dispersion, and simplified equalisation of the effects of chromatic dispersion in particular, without a corresponding scaling in the cost and/or complexity of apparatus at the transmitting or receiving ends.

However, it is well-known that further improvements in received signal quality, as measured by the signal-to-noise ratio (SNR) may be obtained, at least in principle, by using coherent detection techniques. In practice, however, coherent detection requires increased complexity and cost both in the components deployed within transmission links, and in ongoing operation and maintenance of the system.

It is therefore desirable to develop methods and apparatus that are capable of providing improvements in received signal quality (ie SNR) which may approach those available using coherent detection techniques, while retaining the benefits (eg relatively lower cost and greater simplicity) associated with commonly deployed direct detection receivers. The present invention seeks to provide such methods and apparatus.

SUMMARY OF THE INVENTION

In one aspect, the invention provides a method of transmitting digital information over a dispersive, nonlinear optical channel, the method including the steps of, at a transmitting end of the optical channel:

generating an optical signal which includes an optical carrier and an optical sideband, the optical sideband including data symbols encoded in an information signal comprising a plurality of mutually orthogonal information-bearing frequency subcarriers; and transmitting the optical signal over the optical channel, wherein a transmitted optical power of the optical carrier is less than or equal to a corresponding total transmitted optical power of the optical sideband, and wherein the method further includes the steps of, at a receiving end of the optical channel:

processing the optical signal received from the optical channel to increase received power in the optical carrier relative to power in the optical sideband;

detecting the processed optical signal to produce a corresponding electrical signal; and performing a frequency domain equalisation of received data symbols encoded in said frequency subcarriers to recover the transmitted digital information.

Advantageously, the present inventor has determined, through analysis and computer simulations, that optical processing of the received signal to boost carrier power relative to sideband power, prior to detection and electronic processing, can result in improved signal-to-noise ratio (SNR) in the detected electrical signal, and a corresponding improvement in the accuracy and reliability of information recovery. This discovery runs counter to conventional expectations, according to which the signal attenuation and/or additional additive noise resulting from optical processing would normally degrade the quality of the received signal.

It is a particular contribution of the present invention that, for optical signals including an optical carrier and at least one information-bearing optical sideband (eg OSSB signals) optical processing which boosts the optical carrier power relative to the sideband power is able to reduce the effect of certain types of noise and/or distortion present in the detected electrical signal in such a way that a net improvement in SNR may be achieved, despite attenuation of the optical signal which may occur in the optical processing step. In various embodiments, the use of an optical signal including substantially only a single information-bearing optical sideband is particularly preferred in order, for example, to facilitate processing such as dispersion compensation within the electrical domain, such as is disclosed in international application publication no. WO 2007/041799, which is hereby incorporated herein in its entirety by reference. Such preferred embodiments are particularly described herein, however it will be appreciated by those skilled in the relevant art that the application of the present invention is not limited to systems of this type, and that the invention may provide benefits, in terms of improved SNR, in a wide range of systems in which an optical carrier is transmitted along with one or more information-bearing optical sidebands.

In preferred embodiments, the step of processing the optical signal includes passing the signal through one or more optical filters, wherein an optical attenuation applied to the optical carrier is less than a corresponding optical attenuation applied to the optical sideband. While this approach results in an overall reduction in the detected signal power, and/or an increase in optical noise if a compensating optical amplifier is employed, it is nonetheless surprisingly possible to achieve an overall improvement in SNR. In an exemplary embodiment, a suitable optical filter includes at least a first attenuation band corresponding with a frequency range including the optical carrier, and a second attenuation band corresponding with a frequency range including the optical sideband, wherein the filter attenuation in the second frequency range is greater than the filter attenuation in the first frequency range. Typically, the filter includes a transition band between the first and second attenuation bands. Advantageously, improvements may be achieved, in accordance with the inventive principles, even for relatively modest differences in attenuation between the first and second attenuation bands, such that practical realisations of the required optical filters are readily achievable using available components and technologies.

In some embodiments, the step of processing the optical signal may include amplifying the optical signal to increase optical power available in the detecting step. As will be appreciated, while amplification may be used to compensate for attenuation occurring during transmission through the optical channel, and/or in the filters used to boost the optical carrier power relative to the sideband power, such amplification also inevitably results in the addition of optical noise, such as amplified spontaneous emission (ASE) noise, to the optical signal. Nonetheless, as noted previously, the present invention surprisingly enables an overall improvement in SNR of the detected signal to be achieved.

In particularly preferred embodiments, the information-bearing optical sideband corresponds with a transmitted time-varying signal generated from a series of transmitted data blocks, each of which includes a plurality of transmitted data symbols corresponding with one or more bits of the digital information.

In particularly preferred embodiments, the processing of the electrical signal is performed in accordance with an orthogonal frequency division multiplexing (OFDM) method.

The power in the optical carrier of the transmitted optical signal may be less than a corresponding power in the optical sideband. Advantageously, such a reduction in power of the carrier in the transmitted optical signal makes available a greater proportion of the power budget for use by the information-bearing optical sideband, thereby potentially enabling transmission over greater distances and/or with reduced distortion due to nonlinear effects. In accordance with the principles of the invention, the optical carrier may then be boosted at the receiving end, relative to the optical sideband, in order to improve the SNR of the detected signal.

Preferably, following the step of processing the optical signal, power in the optical carrier is greater than a corresponding power in the optical sideband. For example, a ratio between the optical carrier power and the optical sideband power at detection may be at least 5 dB. Advantageously, further improvements in SNR of the detected electrical signal may be realised if the ratio between the optical carrier power and the optical sideband power is at least 10 dB. While still further increases in this ratio may provide corresponding further improvements in SNR, the optical filters and/or other components required to achieve greater ratios in practice may be more costly and/or technically difficult to realise. Advantageously, however, the most substantial benefits of the present invention are able to be achieved with relative modest ratios between carrier power and sideband power.

In another aspect, the invention provides an apparatus for receiving digital information transmitted over a dispersive, nonlinear optical channel, the optical signal including an optical carrier and an optical sideband, the optical sideband including data symbols encoded in an information signal comprising a plurality of mutually orthogonal information-bearing frequency subcarriers, wherein a transmitted optical power of the optical carrier is less than or equal to a corresponding total transmitted optical power of the optical sideband, and wherein the apparatus includes:

at least one optical filter arrangement having an input port arranged to receive the optical signal, and an output port, the filter arrangement being configured such that a ratio of power in the optical carrier relative to power in the optical sideband is increased at the output port relative to a corresponding ratio at the input port;

a detector arranged to receive the optical signal output from the optical filter arrangement to produce a corresponding electrical signal; and an electronic processor configured to perform a frequency domain equalisation of received data symbols encoded in said frequency subcarriers to recover the transmitted digital information.

Preferably, the optical filter arrangement is characterised in that it includes at least a first attenuation band corresponding with a frequency range including the optical carrier, and a second attenuation band corresponding with a frequency range including the optical sideband, wherein the attenuation in the second band is greater than the attenuation in the first band. The apparatus may further include one or more optical amplifiers disposed prior to the input port of the optical filter, and/or between the output port of the optical filter and the detector, in order to increase detected optical signal power.

The information-bearing optical sideband preferably corresponds with a transmitted time-varying signal generated from a series of transmitted data blocks, each of which includes a plurality of transmitted data symbols corresponding with one or more bits of the digital information.

In accordance with particularly preferred embodiments, the electronic processor is configured to recover the digital information in accordance with an OFDM method.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which.

DETAILED DESCRIPTION OF PREFERRED EMBODIMENTS

Figure 1:
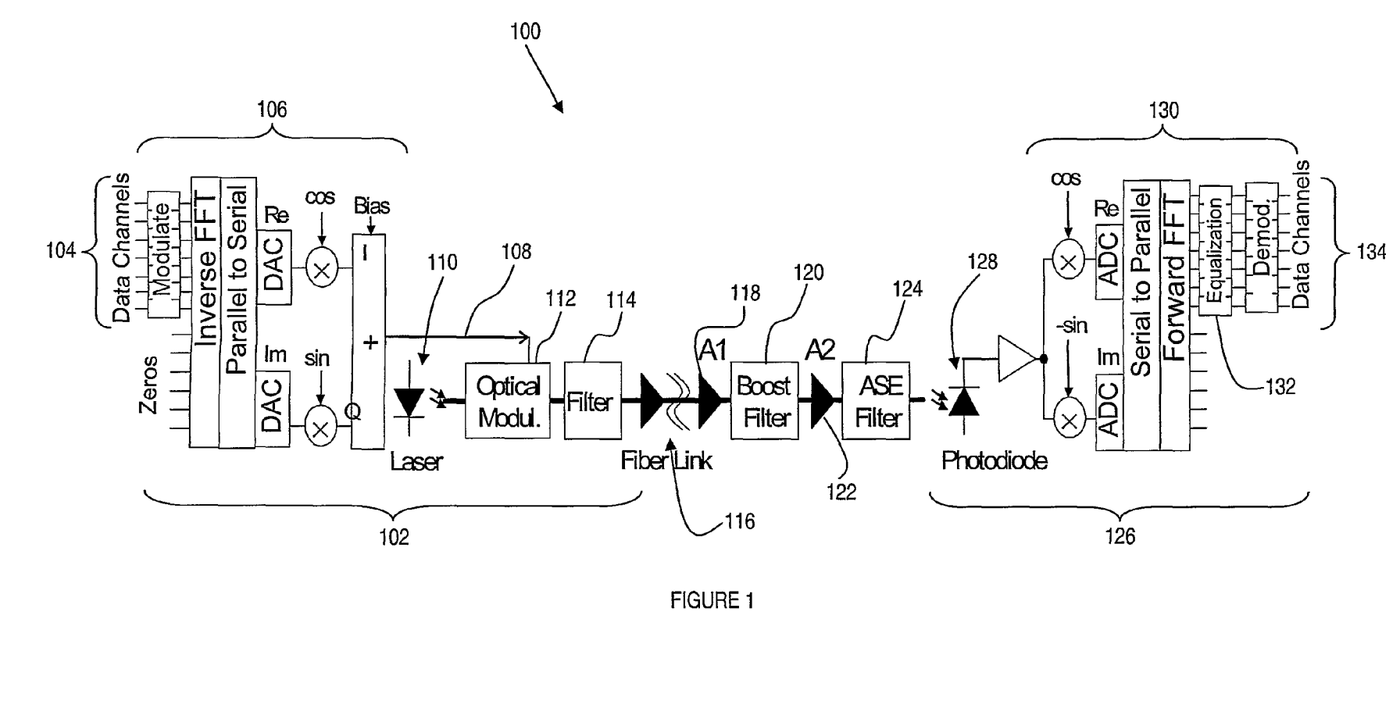
FIG. 1 illustrates schematically a system for communicating digital information over an optical channel, incorporating a receiver according to an embodiment of the present invention.

In FIG. 1, there is shown schematically a system 100 for communicating digital information over an optical channel.

The exemplary system 100 includes a transmitter 102 for generating an optical signal bearing digital information, which is input via the data channels 104. The exemplary transmitter 102 operates generally to generate an optical signal including an optical carrier and substantially only a single information-bearing optical sideband in an optical frequency domain. The information-bearing optical sideband corresponds with a transmitted time-bearing signal generated from a series of transmitted data blocks, each of which includes a plurality of transmitted data symbols corresponding with one or more bits of the digital information input via data channels 104. More particularly, the transmitter 102 operates in accordance with an OFDM method, substantially in the manner described in international application publication no. WO 2007/041799. Full details of the operation of the transmitter 102 are therefore not repeated herein. Generally, however, a signal processing block 106 generates a time-varying OFDM signal 108. A laser source 110 is modulated with the OFDM signal 108, using optical modulator 112. In accordance with the embodiment 102, an optical filter 114 is configured to at least substantially suppress one optical frequency sideband of the intensity modulated signal output from the optical modulator 112. The output of optical filter 114 thus includes substantially only a single information-varying optical sideband in the optical frequency domain, corresponding with the time-varying electrical signal 108. It will be appreciated that this is not the only arrangement possible for generating an optical signal including an optical carrier and substantially only a single information-bearing optical sideband, and a number of approaches are discussed in the aforementioned international application publication no. WO 2007/041799, which may equally be utilised in association with the present invention.

The optical signal output from the transmitter 102 is transmitted over an optical channel 116, which may consist, for example, of a number of spans of single-mode optical fibre and a corresponding series of optical power amplifiers.

Figure 4:
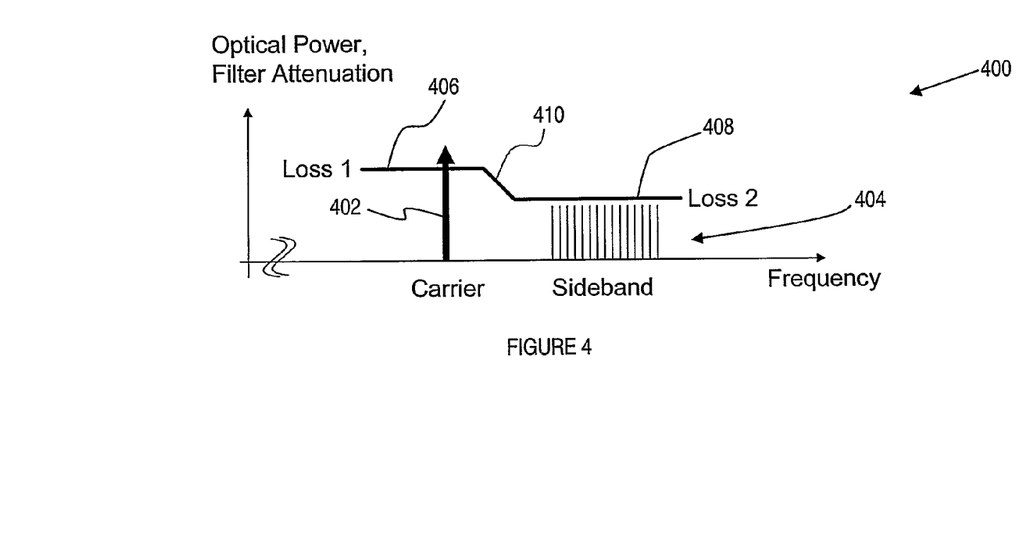
FIG. 4 is a schematic illustration of the operation of a boost filter according to an embodiment of the invention.

In accordance with an embodiment of the present invention, at the receiving end of the optical channel there is provided a first optical power amplifier 118, a "boost" filter 120 (the operation of which is described in greater detail below with reference to FIG. 4) a second optical amplifier 122, and an ASE filter 124 for rejecting out-of-band optical noise generated in the optical amplifiers. It will be appreciated that optical amplifiers 118 and/or 122 may be optional, depending upon the power of the signal at the output of the optical channel 116. Furthermore, the ASE filter 124 is similarly optional, and the functions of the boost filter 120 and ASE filter 124 may, in appropriate circumstances, be combined into a single component.

A receiver 126 includes an optical detector, in the form of photodiode 128, and an electronic processor 130. Signal recovery, processing and equalisation in the processor 130 are performed substantially in accordance with the methods described in international application publication no. WO 2007/041799. In particular, the processor 130 includes digital and/or analog electronic components for generating a series of received data blocks from the time-varying electrical signal output by photodiode 128. An equaliser 132 is arranged to perform a frequency domain equalisation of received data symbols includes in each of the received data blocks, so as to recover data symbols transmitted by the transmitter 102. The recovered digital information is output on data channels 134.

In accordance with the principles of the present invention, the boost filter 120 is an exemplary device configured to process the optical signal received from the optical channel 116 in order to increase received power in the optical carrier relative to power in the optical sideband. However, before turning to a discussion of the operation of the boost filter 120, and the manner in which this is able to achieve improvements in received signal quality as compared with a conventional direct detection receiver, it will be advantageous to provide a more-detailed discussion of the various signal, noise, interference and distortion products generated in the electrical signal output from the photo diode 128.

Figure 2:
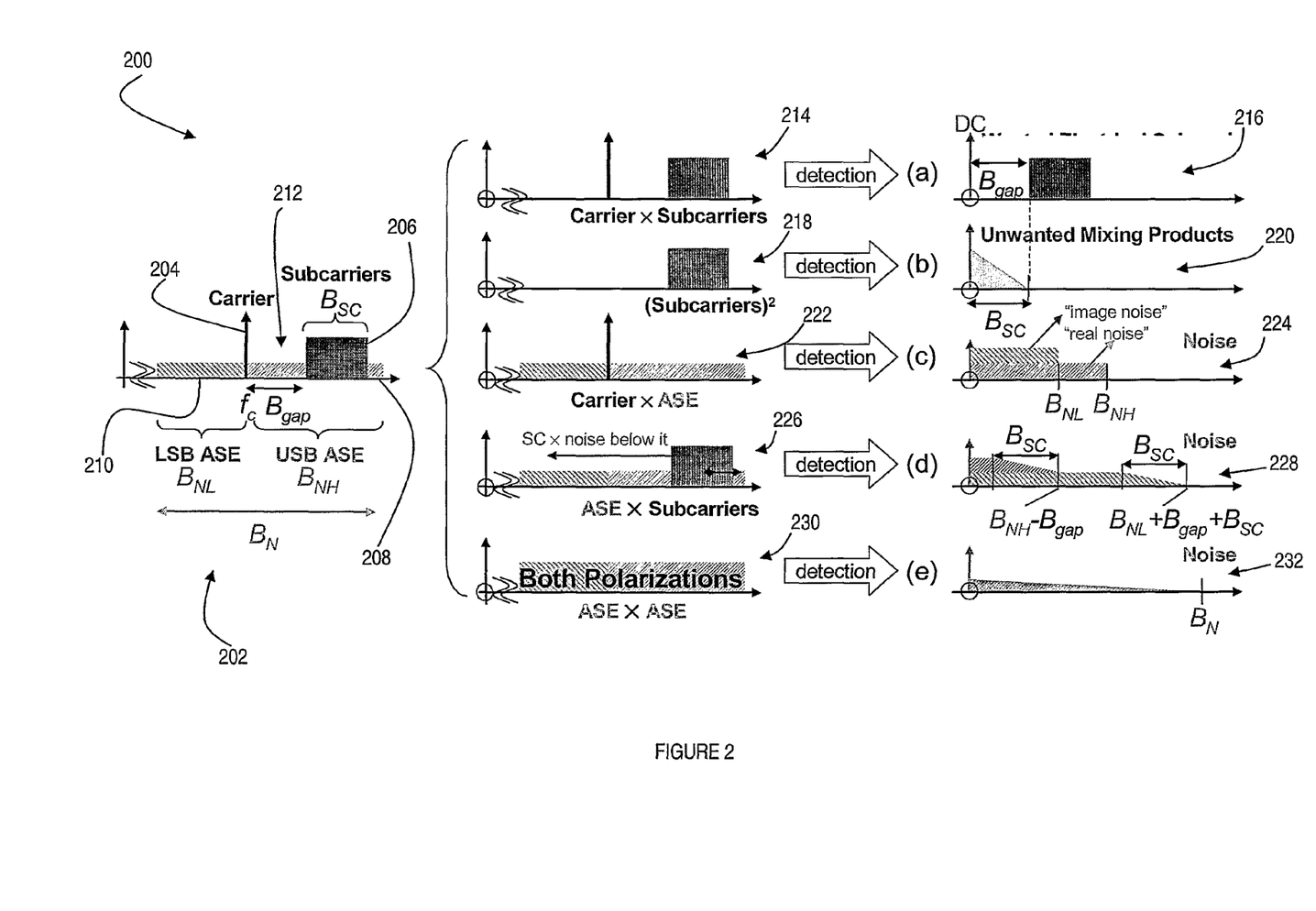
FIG. 2 is a schematic diagram illustrating the various signal, noise and distortion components generated at the receiver of FIG. 1.

FIG. 2 is a schematic diagram 200 illustrating the various signal, noise, interference and distortion components generated in the detector 128 of the receiver 126 of the exemplary transmission system 100. More particularly, FIG. 2 illustrates the received optical spectrum 202, which is output from the optical channel 116. The optical spectrum 202 includes optical carrier 204, information-bearing optical sideband 206, upper sideband ASE noise component 208, and lower sideband ASE noise component 210. The information-bearing subcarriers 206 occupy a bandwidth $B_{sc}$, which are separated from the optical carrier 204 by a frequency guard band of width $B_{gap}$. In principle, ASE noise occurring in portions of the optical spectrum 202 not occupied by the optical carrier 204 and information-bearing subcarriers 206 may be filtered out, however in practice this is generally not technically feasible. Instead, a band of ASE noise, having a bandwidth $B_N$, will generally be passed by a noise filter, eg ASE filter 124. The optical field represented by spectrum 202 is incident upon the photodiode 128, which results in the generation of a corresponding baseband electrical signal at the input to the processor 130. The various spectral contributions to the overall electrical signal are further illustrated in FIG. 2 as described following.

The desired received electrical OFDM signal, having a bandwidth $B_{sc}$, is generated by mixing between the optical carrier and information-bearing subcarriers, 214, to generate the electrical signal spectrum 216. The remaining components illustrated in FIG. 2 represent unwanted, but unavoidable, noise, interference or distortion components.

In particular, the subcarriers 218 also mix amongst themselves to produce a band of unwanted mixing products 220. These occupy a bandwidth of $B_{sc}$ at baseband. If the frequency guard band $B_{gap}$ is greater than or equal to $B_{sc}$, then all of these unwanted mixing products lie at frequencies below the desired electrical subcarrier frequencies, as illustrated in FIG. 2.

The optical carrier and ASE noise components 222 mix to produce baseband electrical noise components 224. These may be considered to consist of a "real noise" component, corresponding with the unavoidable ASE noise falling within the optical bandwidth of the information-bearing subcarriers 206, as well as "image noise" components, lying within the unused sideband, but which are not rejected by the ASE filter 124.

The information-bearing subcarriers also combine with the ASE noise components, as illustrated in the spectrum 226, to produce additional electrical noise spectral components 228.

Finally, ASE noise components 230 intermix to produce corresponding electrical noise components 232.

Of course, all of the mixing processes illustrated in FIG. 2 actually occur simultaneously, and inseparably. However, the diagram 200 illustrates an important insight of the present inventor, which is that only the desired signal spectrum 216, and the spectrum 224 resulting from mixing between the carrier and ASE noise components, are dependent upon the power of the optical carrier 204. Increasing the optical carrier power relative to the other optical spectral components will therefore increase only the power of the desired electrical signal, and the noise contribution 224, while having no impact on the magnitude of the other noise, interference and distortion components 220, 228, 232. There is accordingly a potential benefit, in respect of the received electrical SNR, in manipulating the power in the optical carrier 204 relative to the power in the information-bearing subcarriers 206.

A simple analysis of the electrical SNR is now developed, based upon the assumption that the ASE filter 124 is sufficiently narrow, and the optical signal-to-noise ratio sufficiently high, that the ASE/ASE noise component 232 may be neglected. The analysis enables a simple comparison between the achievable electrical SNR for an ideal coherent detection system and a corresponding direct detection system. It will be understood that the coherent detection system maximises electrical SNR, but is relatively costly and complex to implement in practice. Direct detection systems, by contrast, are relatively simple, and widely deployed in commercial optical communications links.

The power spectral density of the optical noise at the receiver, $PSD_{ASE}$, is:

$$PSD_{ASE} = \frac{P_{ASE}}{B_m} = \frac{(P_{subcarriers} + P_{DDcarrier})}{OSNR \cdot B_m} \quad (1)$$

where $P_{subcarriers}$ is the total signal power at the photodiode integrated over the subcarrier sideband, $P_{DDcarrier}$ is the power at the photodiode of any transmitted carrier (zero for a coherent system) and $P_{ASE}$ is the ASE power in both polarizations integrated over the OSNR measurement bandwidth, $B_m$.

In the RF domain the detected electrical signal power of a single subcarrier is related to the optical power in a single subcarrier, $P_{SC,RF}$, by:

$$P_{SC,RF} = 2 \cdot (R^2/R_L) P_{SC} P_{carrier} \quad (2)$$

where $P_{carrier}$ is the carrier power at the photodiode provided from the transmitter in a DD system, or from the local oscillator in a coherent system, R is the photodiode responsivity, and $R_L$ is the load resistance.

Similarly the noise power in the RF domain, over the bandwidth of an OFDM subcarrier, $\Delta f$, is:

$$P_{noise,RF} = 2\left(\frac{R^2}{R_L}\right)\left(\frac{\Delta f \cdot PSD_{ASE}}{2}\right)(k_{Car} \cdot P_{carrier} + k_{SC} \cdot P_{subcarriers}) \quad (3)$$

Note that only half of the ASE power mixes with the carrier, because the ASE is unpolarised, so half its power is orthogonal to the carrier. The factor $k_{Car}=1$ if image noise is out of band or is rejected by an image-reject coherent receiver, otherwise it increases with filter bandwidth up to $k_{Car}=2$ (component 224 in FIG. 2). The factor $k_{SC}$ is zero for a balanced coherent receiver, as ASE×subcarriers mixing (component 228 in FIG. 2) is rejected, but is between $k_{SC}=1$ and $k_{SC}=2$ for the worst subcarriers in a direct detection receiver, depending on the filter bandwidth.

The electrical signal to noise ratio is found from the above equations:

$$SNR_{elec,power} = \quad (4)$$
$$OSNR\left(\frac{2P_{SC}}{P_{subcarriers} + P_{DDcarrier}}\right) \cdot \left(\frac{P_{carrier}}{k_{Car}P_{carrier} + k_{SC} \cdot P_{subcarriers}}\right)\frac{B_m}{\Delta f}$$

For N subcarriers, $N \cdot P_{SC} = P_{subcarriers}$ and $\Delta f = B_{SC}/N$. Thus for a coherent system, assuming an image-rejection receiver:

$$SNR_{elec,power} = 2 \cdot OSNR \frac{B_m}{B_{SC}} \quad (5)$$

For a 9.8 dB electrical SNR (BER=$10^{-3}$), a 12.5-GHz measurement bandwidth and a 5-GHz subcarrier band, an OSNR of 2.82 dB is required under these conditions. For a direct-detection system with equal power in the carrier and sideband, Equation (4) gives a SNR up to 9-dB poorer than a coherent image-rejection receiver according to Equation (5). Note that Equation (5) may be modified for a coherent system without image rejection, by multiplying by $k_{Car}$.

Figure 3:
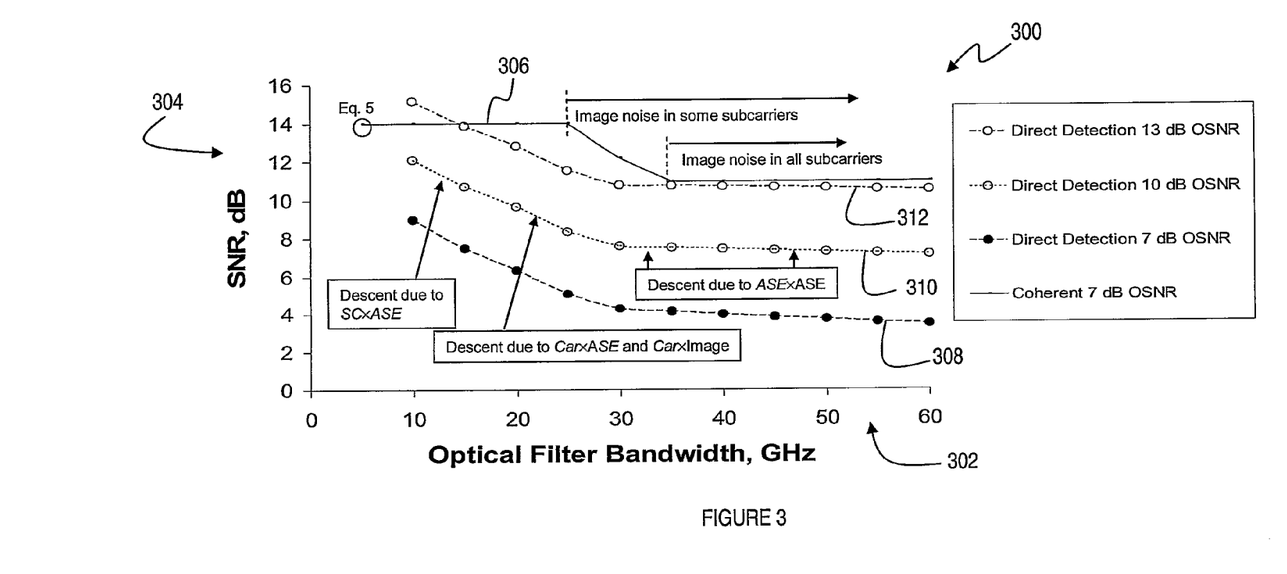
FIG. 3 is a graph of simulation results comparing performance of prior art direct detection and coherent detection receivers.

FIG. 3 is a graph 300 of simulation results comparing, in detail, the performance of prior art direct detection and coherent detection receivers. The X-axis 302 of the graph 300 represents the bandwidth of the ASC filter 124. The Y-axis 304 is the corresponding electrical SNR, measured after detection by the photodiode 128. The simulations corresponded with the exemplary system diagram 100, and were performed using the commercially-available simulation software package VPItransmissionMaker, Version 7.1. The ASE was represented as Gaussian white noise, filtered with a brickwall optical filter. This was added to an optical OFDM signal using 4-QAM modulation, with 1024 bits per OFDM symbol (512 subcarriers). The OFDM waveform was modulated onto an optical carrier using a Mach Zender-type modulator, biased such that the output optical field was proportional to the input OFDM electrical voltage. The resulting bandwidth of the subcarrier spectrum was 5 GHz. A frequency guard band $B_{gap}$ of 5 GHz was provided between the optical carrier and the information-bearing subcarriers. The optical signal-to-noise ratio (OSNR) is defined in the conventional manner, as the mean optical signal power (including carrier) divided by the total ASE noise in both polarisations falling within a 12.5 GHz bandwidth. The electrical SNR (or, equivalently, Q value) is defined in a conventional manner as the square of the mean distance of the detected sample values to the appropriate decision thresholds, divided by the variance in the corresponding components of the QAM signal. Under this definition, an SNR of 9.8 dB gives a bit error ratio (BER) of $10^{-3}$.

Illustrated in the graph 300 are simulation results for a polarisation diverse balanced coherent receiver with 7 dB OSNR (306), and direct detection receivers with OSNRs of 7, 10, and 13 dB (308, 310, 312).

As expected, best performance is achieved (for the comparative cases of 7 dB OSNR) using the ideal coherent receiver. The optimum performance of the coherent receiver, using a sufficiently low bandwidth optical filter, is accurately predicted by Equation (5). Filter bandwidths greater than 25 GHz result in an additional penalty for the low frequency subcarriers, due to mixing of "image" bit noise into the frequency range of the electrical subcarriers. For filter bandwidths greater than 35 GHz, an additional 3 dB penalty is imposed on all subcarriers as a result of this mechanism.

For direct detection systems, the electrical SNR is 5 dB worse than for an ideal coherent receiver when the optical filter bandwidth is 10 GHz. However, practical cost-effective direct detection systems necessarily utilise wider bandwidth optical filters. As the simulation results show, this results in additional SNR degradation due to the mechanisms 224, 228 and 232 illustrated in FIG. 2. As a practical matter, therefore, the electrical SNR achieved using a conventional direct detection system may be more than 9 dB less than the corresponding SNR achievable using a coherent detection system, for the same OSNR. Conversely, for wide optical filter bandwidth the direct detection receiver requires an improvement in input OSNR of around 6 dB or greater, in order to achieve performance comparable with that of the corresponding coherent detection system.

As previously noted, increasing the carrier power in a direct detection system can increase the desirable detected electrical signal power 216, without causing a corresponding increase in a number of the undesirable noise, interference and distortion products 220, 228, 232. However, it is undesirable to transmit relatively high optical carrier power via the optical channel 116, since this may result in increased non-linear distortion, and consumes optical power budget that would be more productively allocated to the information-bearing optical sideband 206. Accordingly, embodiments of the present invention adopt the approach of processing the optical signal received from the optical channel 116, for example using a boost filter 120, in order to increase received power in the optical carrier 204 relative to power in the optical sideband 206 prior to detection and electronic processing. FIG. 4 illustrates schematically a characteristic 400 of a suitable boost filter 120. In particular, the characteristic 400 shows an optical carrier 402, and corresponding information-bearing sideband 404. An appropriate optical filter characteristic includes a first attenuation band 406 corresponding with a frequency range than includes the optical carrier 402, and a second attenuation band 408 corresponding with a frequency range than includes the information-bearing optical sideband 404. The attenuation in the first band 406 is lower than the attenuation in the second band 408, such that the power in the optical carrier 402 at the output of the filter is increased relative to the corresponding output power in the optical sideband 404. A transition band 410 exists between the first attenuation band 406 and the second attenuation band 408, and it will be appreciated that the difficulty of designing and implementing a suitable boost filter will depend substantially upon the required characteristics of the first and second attenuation bands 406, 408, and the transition 410 therebetween. However, as described below with reference to FIG. 5 in particular, a ratio between the attenuation bands 406, 408 of as little as 5 dB may provide a useful improvement in receiver performance, and this degree of filter discrimination, given a transition band ($B_{gap}$) on the order of a few gigahertz, is readily achievable using existing optical filter technology.

Figure 5:
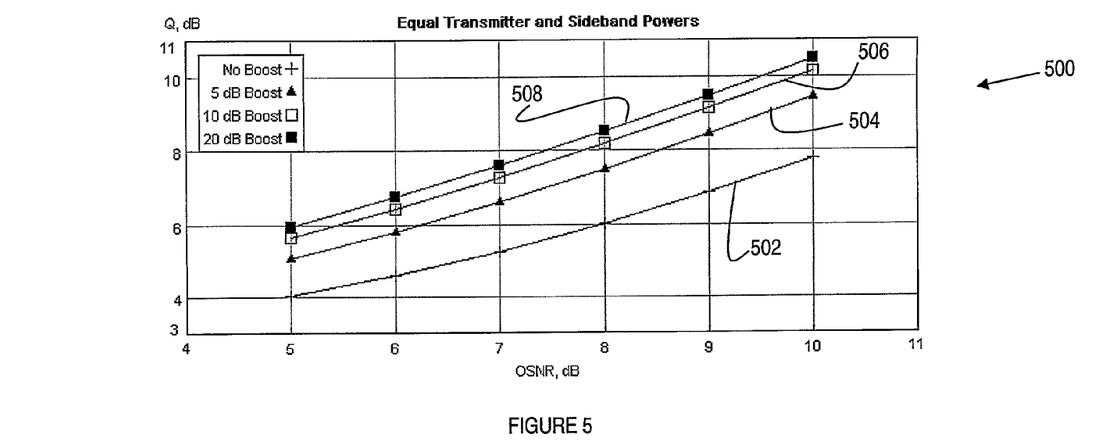
FIG. 5 is a graph of simulation results illustrating performance improvements achieved in accordance with embodiments of the present invention.

FIG. 5 shows a graph 500 of simulation results illustrating performance improvements achieved using boost filters providing ratios of 5 dB, 10 dB and 20 dB between the attenuation applied to the optical carrier and the information-bearing optical sideband. In all simulations, the optical power in the carrier is equal to the total optical power in the sideband prior to processing by the optical boost filter 120. The curve 502 represents the electrical SNR (or Q factor) as a function of OSNR of the received optical signal. The curves 504, 506 and 508 represent the corresponding electrical SNR for relative carrier boost of 5 dB, 10 dB and 20 dB respectively. Substantial improvements in electrical SNR are achieved even with only 5 dB of carrier boost. At 10 dB OSNR, a 2.4 dB improvement is obtained with a relatively modest 10 dB of carrier boost. This may be increased to around 2.8 dB of improvement, using 20 dB carrier boost. This is within 3.4 dB of a corresponding coherent system, but is implemented using a far simpler, and cheaper, direct detection receiver.

Returning to FIG. 2, it may also be noted that applying carrier boost increases the power of the desired electrical signal 216, without a corresponding increase in power of the unwanted subcarrier mixing products 220. A further potential advantage of embodiments of the present invention is therefore that the frequency guard band $B_{gap}$ may potentially be reduced in order to improve spectral efficiency of transmission. Reduction of $B_{gap}$ below the subcarrier bandwidth $B_{sc}$ results in overlap between low frequency information-bearing subcarriers and higher frequency mixing products. However, carrier boost increases the corresponding signal-to-interference ratio.

Figure 6:
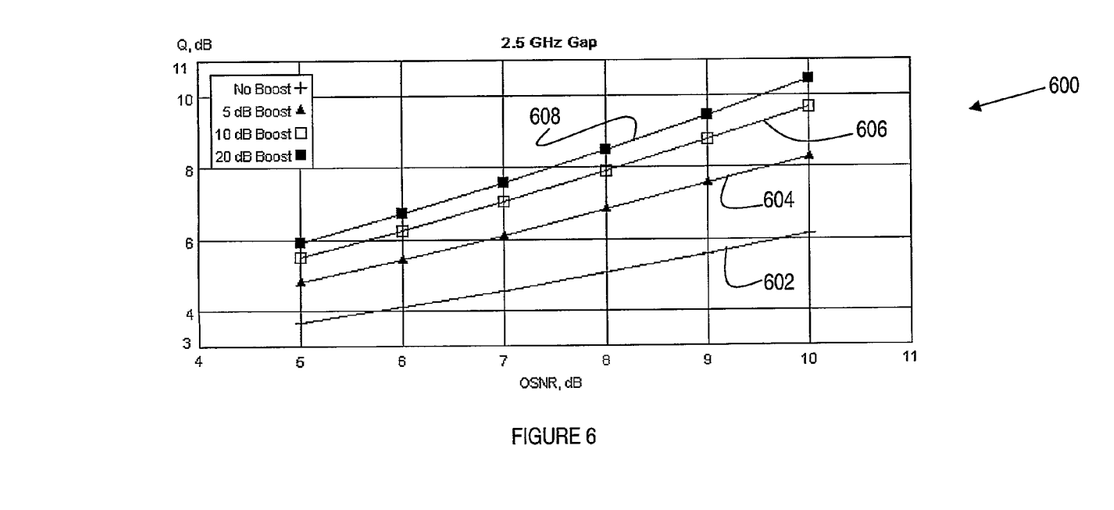
FIG. 6 is a graph of simulation results illustrating a potential for reduction in a frequency guard band achieved in accordance with embodiment of the present invention.

FIG. 6 is a graph 600 which illustrates the corresponding improvements achieved using carrier boost when the frequency guard band is reduced to 2.5 GHz, in the case of a signal having a subcarrier bandwidth of 5 GHz. The curve 602 represents detected electrical SNR as a function of received OSNR without carrier boost, while the curves 604, 606, 608 correspond with carrier boost of 5 dB, 10 dB and 20 dB respectively. By comparison with the results in the graph 500, it can be seen that without carrier boost the electrical SNR is reduced from 7.8 dB to 6.2 dB as a result of the reduced frequency guard band. It should be understood that this is an average value, and that for the arrangement illustrated in FIG. 6, 50% of subcarriers would be affected by the reduced guard band, with the subcarriers closest to the optical carrier potentially being unusable. However, applying carrier boost in all cases improves the SNR, and in particular a 20 dB boost gives a 4 dB improvement in electrical SNR. As noted previously, this improvement in SNR may enable a reduction in the frequency guard bandwidth $B_{gap}$, thereby providing a potential improvement in spectral efficiency.

Figure 7:
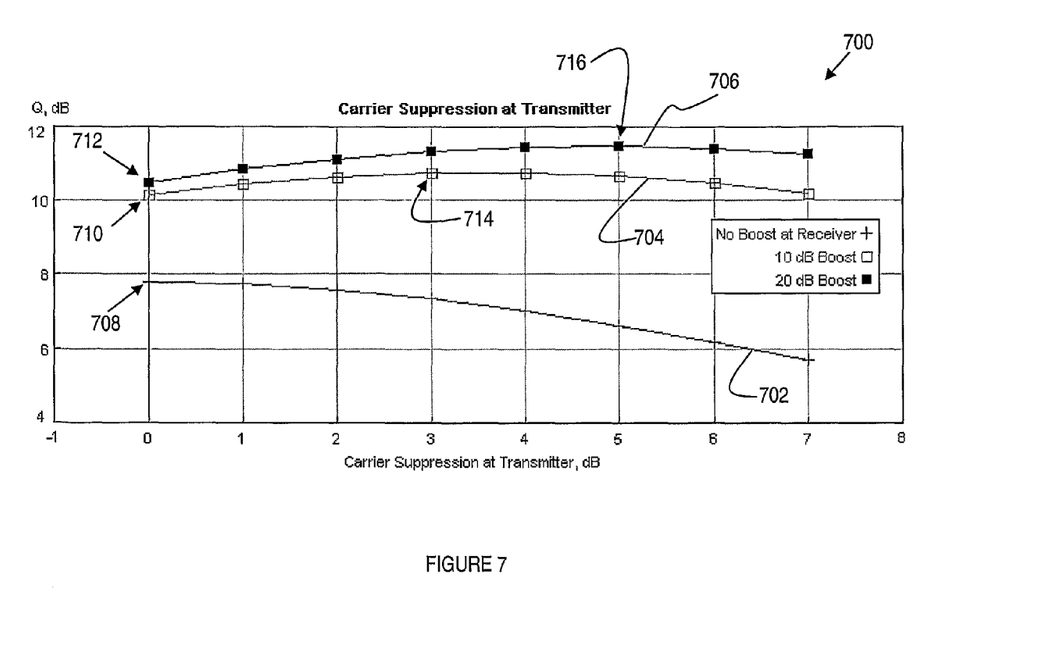
FIG. 7 is a graph of simulation results illustrating further performance improvements achieved in accordance with embodiments of the invention employing carrier suppression at the transmitting end.

An additional system parameter that may be varied is the power in the optical carrier transmitted over the optical channel 116. The possibility of varying the ratio between carrier and sideband power is described in international application publication no. WO 2007/041799. In combination with embodiments of the present invention, suppression of transmitted carrier power may be compensated by the use of carrier boost at the receiver. FIG. 7 is a graph 700 of simulation results illustrating the effect of combining carrier suppression at the transmitter with carrier boost at the receiver, in accordance with embodiments of the present invention. More particularly, the graph 700 illustrates electrical SNR following detection in the receiver as a function of the level of carrier suppression applied at the transmitter. The curve 702 represents the case in which no carrier boost is applied (ie a conventional direct detection receiver), while the curves 704, 706 correspond with 10 dB and 20 dB of carrier boost respectively.

It is apparent from the results shown in the graph 700 that for a conventional system (curve 702) suppression of the carrier power below that of the power in the information-bearing optical sideband generally results in a reduction in the received electrical SNR. However, when a carrier boost is applied, in accordance with embodiments of the present invention, the additional use of an appropriate level of carrier suppression at the transmitter can produce a corresponding additional improvement in the detected electrical SNR. In particular, in the absence of carrier suppression, the use of carrier boost at the receiver results in improved detected SNR, as illustrated by the points 708, 710, 712, which correspond with the results for an OSNR of 10 dB illustrated in the graph 500 of FIG. 5. However, when carrier boost is applied at the receiver, further improvements in detected SNR are achievable when combined with carrier suppression at the transmitter, such that in each case there is an optimum level of carrier suppression that maximises detected electrical SNR at the receiver. For example, with 10 dB carrier boost, a carrier suppression at the transmitter of around 3 dB (point 714) maximises detected electrical SNR. Similarly, for 20 dB carrier boost a corresponding suppression at the transmitter of approximately 5 dB (point 716) maximises detected electrical SNR. The total overall improvement in SNR for this latter case, as compared with the conventional system (ie no carrier suppression or carrier boost, point 708) is nearly 4 dB, which approaches the performance of a corresponding coherent detection system, while avoiding the associated substantially increased complexity and cost.

Advantageously, a reduction in power of the carrier in the transmitted optical signal, as illustrated by the results shown in the graph 700, makes available a greater proportion of the power budget for use by the information-bearing optical sideband, thereby potentially enabling transmission over greater distances and/or with reduced distortion due to nonlinear effects. A reduction in distortion will result, for example, from a reduction in the total optical power due to carrier suppression, as well as a reduction in nonlinear mixing products generated between the carrier and the information-bearing sideband. Accordingly, for systems operated close to a nonlinear limit, this approach may enable the more effective use of nonlinearity compensation, such as that described in international application publication no. WO 2008/074085, which is hereby incorporated herein in its entirety by reference, to provide additional improvements in system capacity and/or reach.

Figure 8:
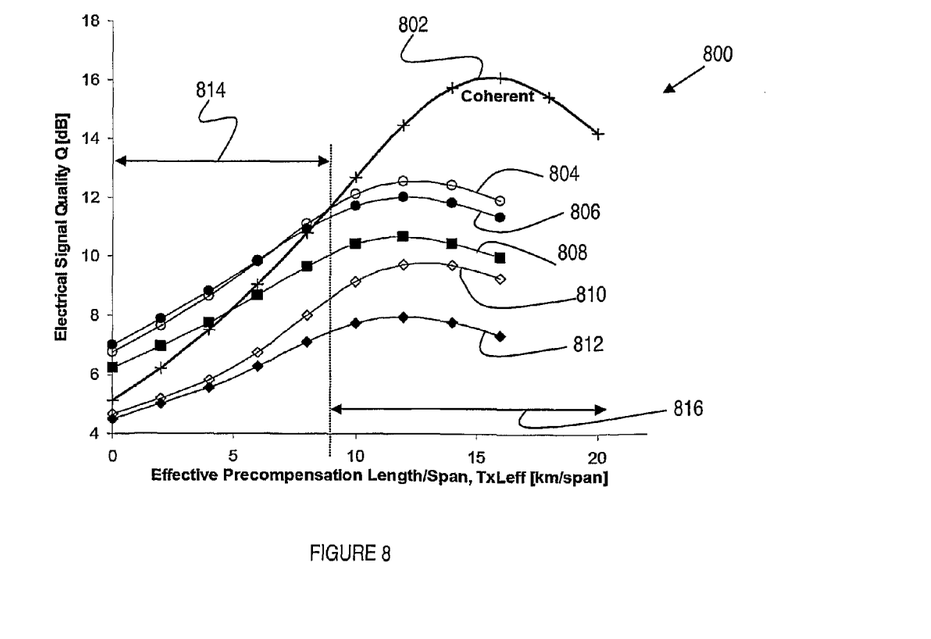
FIG. 8 is a graph of simulation results illustrating improvements in nonlinearity compensation achieved in accordance with embodiments of the invention.

The benefits of reducing the power of the carrier in the transmitted optical signal are illustrated by the further simulation results shown in the graph 800 of FIG. 8. The x-axis of the graph 800 is the Q-factor of the received electrical signal, which has been calculated as a function of the effective precompensation length $L_{eff}$, expressed in km/span, applied in the transmitter (further details of the nonlinear precompensation techniques employed are disclosed in international application publication no. WO 2008/074085). The simulated system includes a 4000 kilometre link of fibre having a dispersion of 2 ps/nm/km, consisting of individual spans of 80 kilometres with fibre attenuation of 0.2 dB/km. Optical amplifiers are incorporated at the input of each span, to boost the optical power back to −3 dBm, however amplifier noise was artificially excluded in the simulations to enable a study of the nonlinear effects in isolation. In each group of simulations, one of two levels of carrier suppression was employed at the transmitter, in combination with one of four levels of carrier boost at the receiver. The carrier boost was achieved using a 1 GHz band-pass optical filter with a variable stop band attenuation. Additionally, a set of simulations was performed for an ideal coherent system, for the purposes of comparison.

The curve 802 in graph 800 represents the signal quality as a function of effective precompensation length for the ideal coherent system. The further curves 804, 806, 808, 810, 812 represent electrical signal quality as a function of effective precompensation length for five different direct-detection systems, employing different combinations of carrier suppression at the transmitter, and carrier boost at the receiver. In particular, the curve 804 represents a system with 5 dB of transmitter carrier suppression and 15 dB of receiver carrier boost. The curve 806 corresponds with 0 dB of transmitter carrier suppression and 10 dB of receiver carrier boost. The curve 808 corresponds with 0 dB of transmitter carrier suppression and 5 dB of receiver carrier boost. The curve 810 corresponds with 5 dB of transmitter carrier suppression and 5 dB of receiver carrier boost. Finally, the curve 812 corresponds with 0 dB of a transmitter carrier suppression and 0 dB of receiver carrier boost (ie a "standard" single sideband, direct-detection, system). In all cases, carrier suppression at the transmitter is relative to a carrier power level that is equal to the total sideband power level.

As anticipated, all of the systems employing receiver carrier boost (ie corresponding with curves 804, 806, 808, 810) exhibit superior performance to the unboosted system (corresponding with curve 812). More particularly, all receiver-boosted systems are able to achieve greater benefits through the use of nonlinear precompensation than the unboosted system. Furthermore, the systems employing transmitter carrier suppression (corresponding with curves 804 and 810) exhibit superior performance when an optimum level of nonlinear precompensation is applied as compared with non-carrier suppressed systems having the same net carrier gain (ie the same difference between the receiver boost level and the transmitter suppression level, as represented by the curves 806 and 812).

Unsurprisingly, an ideal coherent system, represented by the curve 802, is able to achieve the best maximum received signal quality, when an optimum level of nonlinear precompensation is applied. More surprisingly, there is a range 814 of precompensation values for which the carrier-boosted direct detection systems are able to achieve superior performance to the coherent system. Above this range, ie in the range 816, the ideal coherent system achieves superior performance to all of the carrier-boosted direct detection systems. The reason for the better performance of the direct detection system in under-compensated cases is that the optical carrier accumulates the same phase modulation as the subcarriers during propagation through the optical fibre transmission link, such that nonlinear-induced phase errors are partially cancelled upon detection. However, when optimal precompensation is applied the "walk-off" between the optical carrier and the subcarriers, due to fibre dispersion, ultimately limits the maximum received signal quality that can be achieved by way of nonlinear precompensation.

In practice, it is likely that systems implemented in accordance with the principles of the present invention will more closely approach the actual practical performance of systems employing coherent detection, since the foregoing analysis and simulations do not take into account non-ideal properties of real coherent detection arrangements. In particular, the effect of phase noise (ie laser linewidth) of the local oscillators employed in coherent detectors, as well as the impact of imbalance in nominally balanced detector arrangements, both of which may degrade coherent receiver systems, have not been taken into account.

It will be clear to those skilled in the art, from the foregoing description, that many variations of the present invention are possible, and that the invention is not therefore to be limited to the particular embodiments described herein. Rather, the scope of the invention is defined by the claims appended hereto.

The invention claimed is:

1. A method of transmitting digital information over a dispersive, nonlinear optical channel, the method including the steps of, at a transmitting end of the optical channel:
generating an optical signal which includes an optical carrier and an optical sideband, the optical sideband including data symbols encoded in an information signal comprising a plurality of mutually orthogonal information-bearing frequency subcarriers; and
transmitting the optical signal over the optical channel, wherein a transmitted optical power of the optical carrier is less than or equal to a corresponding total transmitted optical power of the optical sideband, and wherein the method further includes the steps of, at a receiving end of the optical channel:
processing the optical signal received from the optical channel to increase received power in the optical carrier relative to power in the optical sideband;
detecting the processed optical signal to produce a corresponding electrical signal; and
performing a frequency domain equalisation of received data symbols encoded in said frequency subcarriers to recover the transmitted digital information.

2. The method of claim 1 wherein the step of processing the optical signal includes passing the signal through one or more optical filters, wherein an optical attenuation applied to the optical carrier is less than a corresponding attenuation applied to the optical sideband.

3. The method of claim 2 wherein said one or more optical filters include at least a first attenuation band corresponding with a frequency range including the optical carrier, and a second attenuation band corresponding with a frequency range including the optical sideband, wherein the filter attenuation in the second frequency range is greater than the filter attenuation in the first frequency range.

4. The method of claim 1 wherein the step of processing the optical signal includes amplifying the optical signal to increase optical power available in the detecting step.

5. The method of claim 1 wherein the optical signal is generated such that a frequency guard band ($B_{gap}$) is provided between the optical carrier and the optical sideband, a width of the frequency guard band ($B_{gap}$) preferably being greater than or equal to a bandwidth ($B_{sc}$) occupied by the frequency subcarriers of the optical sideband.

6. The method of claim 1 wherein the step of processing the optical signal is performed such that a power of the optical carrier following processing is greater than a corresponding total power of the optical sideband, such as a ratio between the carrier power and the sideband power of at least 5 dB, or of at least 10 dB.

7. The method of claim 1 further including the step, at the transmitting end of the optical channel, of processing the information signal to apply a precompensation for nonlinear transmission effects of the optical channel.

8. An apparatus for receiving digital information transmitted over a dispersive, nonlinear optical channel, the optical signal including an optical carrier and an optical sideband, the optical sideband including data symbols encoded in an information signal comprising a plurality of mutually orthogonal information bearing frequency subcarriers, wherein a transmitted optical power of the optical carrier is less than or equal to a corresponding total transmitted optical power of the optical sideband, and wherein the apparatus includes:
at least one optical filter arrangement having an input port arranged to receive the optical signal, and an output port, the filter arrangement being configured such that a ratio of power in the optical carrier relative to power in the optical sideband is increased at the output port relative to a corresponding ratio at the input port;
a detector arranged to receive the optical signal output from the optical filter arrangement to produce a corresponding electrical signal; and
an electronic processor configured to perform a frequency domain equalisation of received data symbols encoded in said frequency subcarriers to recover the transmitted digital information.

9. The apparatus of claim 8 wherein the optical filter arrangement includes at least a first attenuation band corresponding with a frequency range including the optical carrier, and a second attenuation band corresponding with a frequency range including the optical sideband, wherein the attenuation in the second band is greater than the attenuation in the first band.

10. The apparatus of claim 9 wherein a transition band between said first attenuation band and said second attenuation band is provided within a frequency guard band ($B_{gap}$) included in the transmitted optical signal between the optical carrier and the optical sideband.

11. The apparatus of claim 8 further including one or more optical amplifiers disposed prior to the input port of the optical filter and/or between the output port of the optical filter and the detector, in order to increase detected optical signal power.

12. The apparatus of claim 8 wherein the optical filter arrangement is configured such that power of the optical carrier at the output port is greater than a corresponding total power of the optical sideband at the output port, such as a ratio between carrier power and sideband power of at least 5 dB.

13. A system for transmitting digital information over a dispersive, nonlinear optical channel, including:
a transmitter configured to generate an optical signal which includes an optical carrier and an optical sideband, a transmitted power of the optical carrier being less than or equal to a corresponding total transmitted power in the optical sideband, and the optical sideband including data symbols encoded in an information signal comprising a plurality of mutually orthogonal information bearing frequency subcarriers; and
a receiver for receiving the optical signal in accordance with claim 8.

14. The system of claim 13 wherein the transmitter is further configured to generate the optical signal having a frequency guard band ($B_{gap}$) between the optical carrier and the optical sideband, a width of the frequency guard band ($B_{gap}$) preferably being greater than or equal to a bandwidth ($B_{sc}$) occupied by the frequency subcarriers of the optical sideband.

15. The system of claim 13 wherein the transmitter is further configured to process the information signal to apply a precompensation for nonlinear transmission effects of the optical channel.

* * * * *